United States Patent [19]

Saito

[11] 4,438,652
[45] Mar. 27, 1984

[54] ULTRASONIC DOPPLER FLOWMETER

[75] Inventor: Kouji Saito, Katsuta, Japan

[73] Assignee: Hitachi, Ltd., Tokyo, Japan

[21] Appl. No.: 354,620

[22] Filed: Mar. 4, 1982

[30] Foreign Application Priority Data

Mar. 6, 1981 [JP] Japan .................................. 56-31358

[51] Int. Cl.³ .............................................. G01F 1/66
[52] U.S. Cl. .................................................. 73/861.25
[58] Field of Search .............. 73/861.25, 613; 367/90, 367/98

[56] References Cited

U.S. PATENT DOCUMENTS 3,449,710  6/1969  Moss, Jr. ................................. 367/98
3,741,014  6/1973  Tamura ............................. 73/861.25
4,122,713  10/1978  Stasz et al. ....................... 73/861.25
4,198,866  4/1980  Birjukov et al. ....................... 73/613
4,208,908  6/1980  Hickox ............................. 73/861.25

Primary Examiner—Charles A. Ruehl
Attorney, Agent, or Firm—Antonelli, Terry & Wands

[57] ABSTRACT

An ultrasonic Doppler flowmeter in which a received signal processing part includes a reference signal generator for generating a reference signal corresponding to the magnitude of a received signal, and a comparator for comparing the received signal with the reference signal. The reference signal varies in accordance with the magnitude of the received signal, and further may possess a hysteresis width corresponding to the output of the comparator. Therefore, a noise signal is effectively removed from the received signal at the comparator, and only a Doppler shift frequency is detected.

8 Claims, 14 Drawing Figures

ULTRASONIC DOPPLER FLOWMETER

The present invention relates to a flowmeter employing the Doppler effect, and more particularly to a flowmeter in which a Doppler shift frequency is detected to measure the flow rate of a fluid.

In a Doppler flowmeter, for example, an ultrasonic wave having a frequency $f_1$ is emitted into a fluid and a reflected ultrasonic wave from a reflector, such as a slurry contained in the fluid, is measured. In more detail, the transmitted ultrasonic wave is subjected to a frequency modulation corresponding to the velocity of the reflector when reflected from the reflector. Thus, the transmitted frequency $f_1$ is different from a frequency $f_2$ of the reflected ultrasonic wave due to a Doppler shift which depends upon the velocity of the reflector. A Doppler shift frequency $\Delta f$ is given by the following equation:

$$\Delta f = f_2 - f_1 = 2(V/C)f_1 \cos\theta$$

where $f_1$ indicates the frequency of an ultrasonic wave emitted from a transmitter, $f_2$ the frequency of the ultrasonic wave reflected from a reflector, $V$ the speed at which the reflector is moving, $C$ the speed of sound in a fluid, and $\theta$ the angle between the direction of propagation of the ultrasonic wave in the fluid and the direction of movement of the reflector.

In general, the speed at which the reflector is moving may be considered to be equal to the speed of the flowing fluid, and therefore the speed of the fluid can be determined by measuring the Doppler shift frequency $\Delta f$. Further, when the cross section $S$ of a pipe, through which the fluid flows, is given, the flow rate or a quantity of flow $Q$ of the fluid can be given by the following equation:

$$Q = V \cdot S$$

A received signal obtained by a receiving transducer contains a noise signal in some degree, in addition to a Doppler shift signal component to be measured. In order to eliminate errors in measurements, it is necessary to remove the noise signal from the received signal. Accordingly, conventional Doppler flowmeters are provided with a comparator for rejecting signals having a level lower than a fixed reference level, to remove the noise signal. In these flowmeters, however, since the reference level is fixed, it has been sometimes impossible to effectively remove the noise signal in the case where the magnitude of the received signal is varied in a marked degree due to a change in measuring conditions. In more detail, the magnitude of the received signal may vary markedly due to a considerable change in the concentration of solutes or mixtures in a fluid to be measured, or due to the deterioration of the characteristics of transmitting and receiving ultrasonic transducers. When the received signal is much larger in magnitude than a reference level signal, it is not possible to effectively remove the noise signal from the received signal. On the other hand, when the received signal is smaller in magnitude than the reference level signal, there is a fear of erasing even the Doppler shift frequency component to be detected. Thus, the above-mentioned changes in measuring conditions can cause errors in the measurements. Further, a change in temperature of the fluid may cause similar unfavorable phenomena. In order to eliminate those errors in measurements which are caused by temperature changes, a flowmeter is proposed in U.S. Pat. No. 4,208,908, in which a temperature change is detected by a thermistor, and the above-mentioned reference level is varied in accordance with the output of the thermistor to achieve the temperature compensation of the flowmeter. Although this method is effective for the temperature change, it is impossible to compensate for errors in measurements due to causes other than the temperature change.

The present invention is based upon a finding that, by varying the above-mentioned reference signal in response to various changes in measuring conditions, it is possible to effectively remove a noise signal caused by any external disturbance, and thus a Doppler shift frequency can be validly detected.

It is an object of the present invention to provide an ultrasonic Doppler flowmeter which can measure a flow rate accurately and stably for any change in measuring conditions.

It is another object of the present invention to provide an ultrasonic Doppler flowmeter in which a noise signal can be effectively removed from a Doppler shift frequency signal, and therefore a flow rate can be measured validly.

It is a further object of the present invention to provide an ultrasonic Doppler flowmeter which can measure flow rate in a stable manner even when there arise such changes in measuring conditions as a change in concentration of a fluid to be measured, a temperature change and the deterioration of the characteristics of transmitting and receiving ultrasonic transducers.

It is still another object of the present invention to provide an ultrasonic Doppler flowmeter which can perform a stable operation for changes in conditions of setting of the flowmeter.

According to an aspect of the present invention, there is provided an ultrasonic Doppler flowmeter, in which comparator means is provided in a received signal processing part thereof, and a reference signal (threshold voltage) applied to the comparator means is varied in accordance with the magnitude of a received signal to effectively remove a noise signal from the received signal.

The present invention will be apparent from the following detailed description taken in conjunction with the accompanying drawings, in which.

Figure 1:
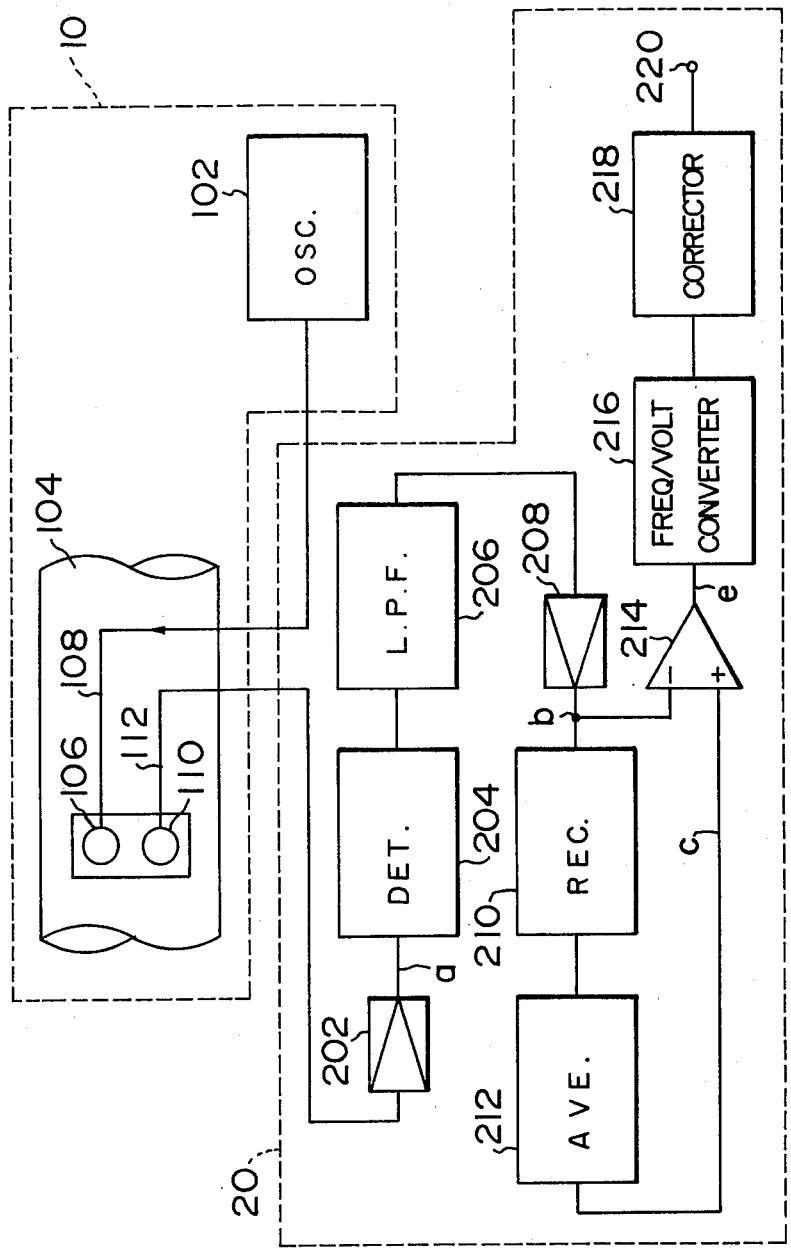
FIG. 1 is a block diagram showing an embodiment of an ultrasonic Doppler flowmeter according to the present invention.

Now, explanation will be made on a first embodiment of an ultrasonic Doppler flowmeter according to the present invention, with reference to FIGS. 1 and 2a to 2e. Referring first to FIG. 1, an ultrasonic Doppler flowmeter comprises a transmitting/receiving part 10 and a received signal processing part 20.

In the transmitting/receiving part 10, an oscillator 102 is connected through a conductor 108 to a transmitting ultrasonic transducer 106 provided on a pipe 104. A receiving ultrasonic transducer 110 provided on the pipe 104 is connected through a conductor 112 to a radio frequency amplifier 202 included in the signal processing part 20. The output of the radio frequency amplifier 202 is connected to a detector 204, the output of which is connected to a low-pass filter 206. The output of the low-pass filter 206 is connected to a low frequency amplifier 208, the output of which is connected to an input of a comparator 214 and to a full wave rectifier circuit 210. The output of the full wave rectifier circuit is connected to an average or smoothing circuit 212, the output of which is connected to the other input of the comparator 214. The output of the comparator 214 is connected to a frequency-voltage converter 216, the output of which is connected to a correction part 218 for making corrections using such a coefficient as the cross section of the pipe. Thus, the received flow rate of fluid is obtained from an output terminal 220.

Figure 2A:
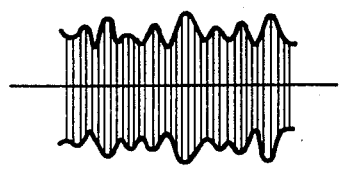
FIGS. 2a to 2e show signal waveforms at main parts of the embodiment shown in FIG. 1.
Figure 2B:
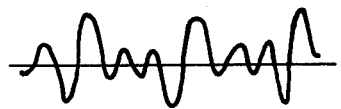
Figure 2C:
Figure 2D:
Figure 2E:

Next, the operation of the first embodiment will be explained. A transmitted signal having a frequency $f_1$ is sent from the oscillator 102 to the transmitting ultrasonic transducer 106 to be converted into an ultrasonic wave. The ultrasonic wave thus produced is emitted from the transducer 106 in a certain direction into a fluid which is to be measured and flows through the pipe 104. An ultrasonic wave reflected from a reflector (not shown), which is suspended, floated or mixed in the fluid to be measured, is received by the receiving ultrasonic transducer 110 to be converted into an electric signal having a frequency $f_2$. As mentioned previously, the transmitted ultrasonic wave is subjected to frequency modulation in accordance with the velocity of the fluid when reflected from the reflector, that is, the reflected frequency $f_2$ is different from the transmitted frequency $f_1$ due to the so-called Doppler shift. In general, reflectors suspended in the fluid may have different speeds at different positions within the pipe due to the drag influence of the inner surface of the wall of the pipe or any turbulence in the flowing fluid, and therefore a received signal obtained by the transducer 110 may have a band of Doppler frequencies. Further, the received signal contains a component corresponding to an ultrasonic wave which is transmitted from the transducer 106 and then received directly by the transducer 110 without being reflected by any reflector. The received signal is amplified by the radio frequency amplifier 202 to form a signal as shown in FIG. 2a. The signal shown in FIG. 2a has a waveform such as obtained by amplitude-modulating a carrier having a fundamental frequency with a signal having a Doppler shift frequency $\Delta f$, and moreover contains a noise component. The received and amplified signal having an envelope modulated at a Doppler shift frequency is applied to the low frequency amplifier 208 through the detector 204 and low-pass filter 206 to form a signal as shown in FIG. 2b. The signal shown in FIG. 2b is formed mainly of a signal component having the Doppler shift frequency. Here, the change in the amplitude of the signal is exaggerated in FIG. 2b. The received signal which has been amplified by the low frequency amplifier 208, is not only applied to one of two input terminals of the comparator 214, but also applied to the other input terminal of the comparator 214 through the full wave rectifier circuit 210 and average circuit 212 to supply a reference signal (namely, a threshold signal) to the comparator 214. In other words, the received signal which has been amplified by the low frequency amplifier 208, namely, the signal shown in FIG. 2b is subjected to full wave rectification and then subjected to an averaging operation to form such a reference signal as shown in FIG. 2C. The reference signal shown in FIG. 2C corresponds in magnitude to the averaged magnitude of the signal shown in FIG. 2b. The signal shown in FIG. 2b and the reference signal shown in FIG. 2c are compared, as shown in FIG. 2d, at the comparator 214 to obtain such an output as shown in FIG. 2e. That is, a detected signal which is smaller than the reference signal (shown in FIG. 2c), is removed. Thus, a noise signal mixed in the received signal is removed, and only the Doppler shift frequency component is detected. As mentioned above, the magnitude of the reference signal varies in accordance with the magnitude of the received signal, and therefore the noise signal mixed in the received signal can be effectively removed even when the received signal varies widely in magnitude due to a change in concentration of the fluid, a temperature change and for other reasons.

Then, the output of the comparator 214 is converted by the frequency-voltage converter 216 into a voltage, which is multiplied at the correction circuit 218 with such correction coefficients as the direction of propagation of the ultrasonic wave and the cross section of the pipe, to provide a flow rate signal at the output terminal 220.

Figure 3:
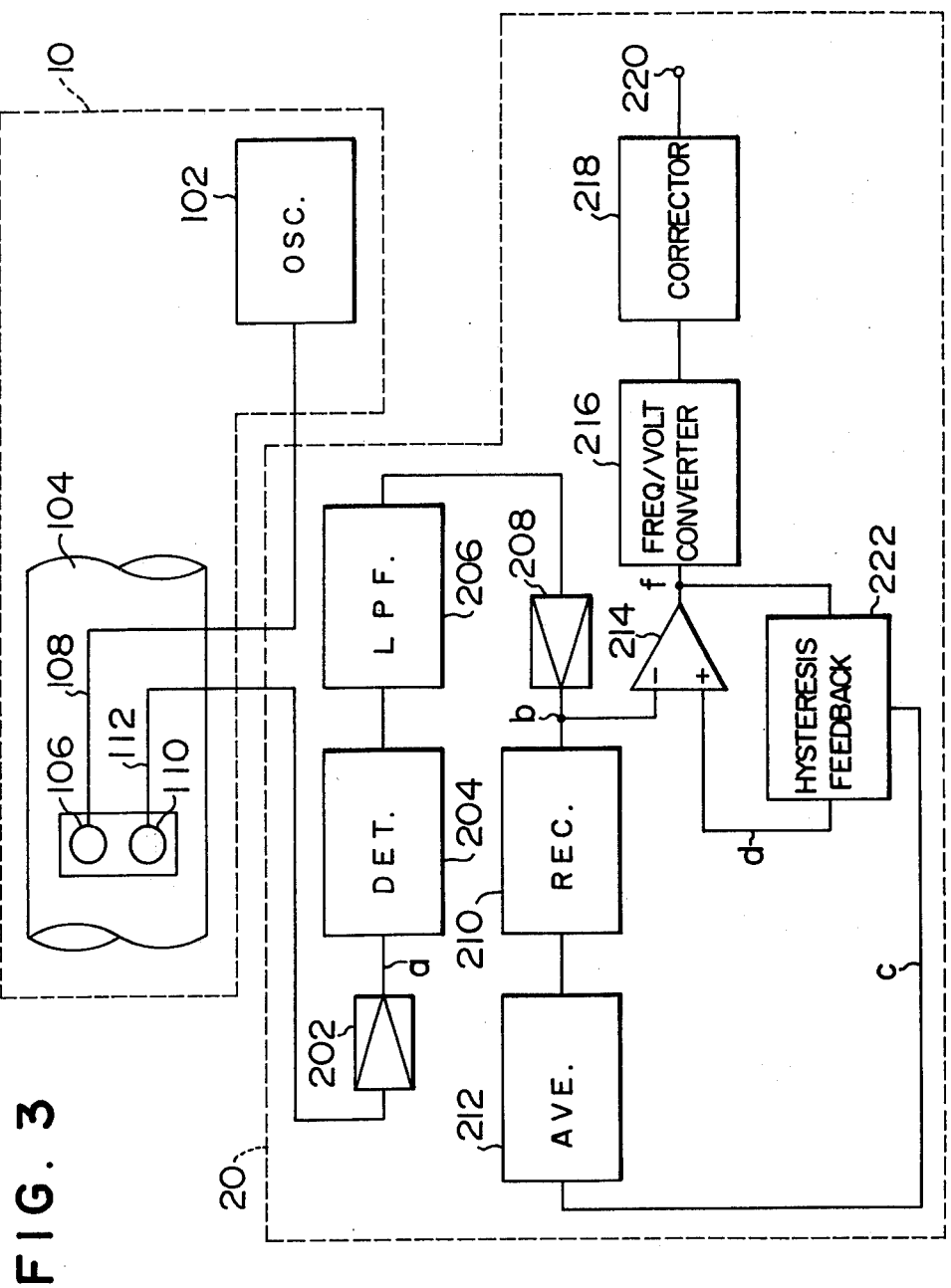
FIG. 3 is a block diagram showing another embodiment of an ultrasonic Doppler flowmeter according to the present invention.

Next, explanation will be made of a second embodiment of an ultrasonic Doppler flowmeter according to the present invention, with reference to FIGS. 3 and 4a to 4g. In FIGS. 1 and 3, similar reference numerals designate similar parts.

The embodiment shown in FIG. 3 is different from the embodiment shown in FIG. 1 only in that the output of a comparator 214 is fed back to a reference signal input terminal of the comparator 214 through an automatic hysteresis control circuit 222, and the output of an average circuit 212 is connected to the automatic hysteresis control circuit 222.

Figure 4A:
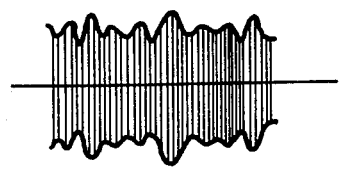
FIGS. 4a to 4g show signal waveforms at main parts of the embodiment shown in FIG. 3.
Figure 4B:
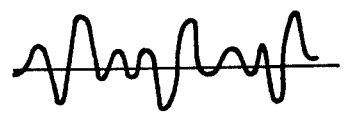
Figure 4C:
Figure 4F:
Figure 4D:
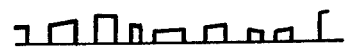
Figure 4E:
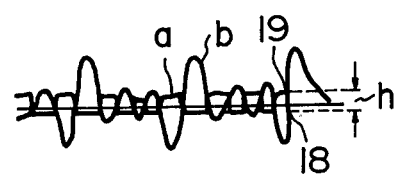
Figure 4G:
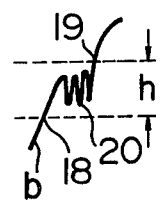

Such an output of the average circuit 212 as shown in FIG. 4c is applied to the automatic hysteresis control circuit 220, and is transmitted when the comparator 214 generates a low level output and is brought to a low level (blocked) when the comparator 214 generates a high level output to form a signal as shown in FIG. 4d. The signal shown in FIG. 4d is shifted (pulled down) in level by an appropriate bias circuit (not shown), and then applied to the comparator as a reference signal. The reference signal thus formed and a received signal shown in FIG. 4b are compared, as shown in FIG. 4e, at the comparator 214. The height of each of the pulses forming the above-mentioned reference signal is used as a hysteresis width (noise-immune zone) in the comparator 214. In other words, the comparator is driven to be immune when the received signal once goes down to the negative polarity. The hysteresis width will be explained below, with reference to FIG. 4g, which is an enlarged view showing a portion of the waveform shown in FIG. 4e. As shown in FIG. 4g, an actual received signal shown in FIG. 4b contains a noise component 20, which may be caused by any external disturbance. It is needless to say that the noise component 20 should preferably be removed. In this embodiment, the noise component 20 existing in that region of the received signal which is bounded by points 18 and 19, lies within a range given by the height h of a pulse included in the reference signal, and the height h of the pulse acts as an immune zone in the comparator 214 to effectively remove the noise component 20 near the zero level.

In the first embodiment, there has been shown a circuit configuration in which the reference signal (namely, the threshold voltage) applied to the comparator 214 varies in accordance with the magnitude of the received signal. Further, a circuit configuration for giving a hysteresis width to the reference signal for holding the output state of the comparator against small variations has been shown in the second embodiment. These functions can be similarly achieved also in apparent alterations or modifications or when some additional parts or elements are included in the disclosed embodiments. It will be apparent that the present invention is not limited to the circuit configurations shown in the embodiments.

I claim:

1. An ultrasonic Doppler flowmeter comprising:
   transmitting means for transmitting an ultrasonic wave of a fixed frequency into a fluid flow to be measured;
   receiving means for receiving a reflected ultrasonic wave from said fluid; and
   signal processing means including a reference signal generator and a comparator, said reference signal generator generating a reference signal upon reception of a received signal from said receiving means in accordance with the magnitude of the received signal, said comparator being supplied with said received signal and said reference signal to compare said received signal with said reference signal.

2. An ultrasonic Doppler flowmeter according to claim 1, wherein said reference signal generator includes an average circuit for averaging said received signal.

3. An ultrasonic Doppler flowmeter according to claim 2, wherein said reference signal generator further includes a full wave rectifier for rectifying said received signal to supply a rectified received signal to said average circuit.

4. An ultrasonic Doppler flowmeter comprising:
   transmitting means for transmitting an ultrasonic wave of a fixed frequency into a fluid to be measured;
   receiving means for receiving a reflected ultrasonic wave from said fluid to be measured; and
   signal processing means including a reference signal generator, and a comparator, said reference signal generator including a preliminary reference generator for generating a preliminary reference signal upon reception of a received signal from said receiving means in correspondence to the magnitude of the received signal and a comparison reference generator for generating a comparison reference signal based on said preliminary reference signal, said comparator being supplied with said comparison reference signal and said received signal to compare said received signal with said comparison reference signal, said comparison reference generator being supplied with said preliminary reference signal and the output of said comparator to generate said comparison reference signal.

5. An ultrasonic Doppler flowmeter according to claim 4, wherein said reference signal generator includes an averaging circuit for averaging said received signal.

6. An ultrasonic Doppler flowmeter according to claim 5, wherein said reference signal generator further includes a full wave rectifier for rectifying said received signal to supply a rectified received signal to said averaging circuit.

7. An ultrasonic Doppler flowmeter for measuring a flow rate of a fluid, comprising:
   transmitting means for transmitting an ultrasonic wave of a predetermined frequency into a fluid flow to be measured;
   receiving means for receiving a reflected ultrasonic wave from said fluid;
   a detecting circuit for detecting a Doppler shift signal component from the output of said receiving means;
   a reference signal circuit connected to said detecting circuit for generating a reference signal based on an average of the magnitude of the detected signal from said detecting circuit;
   a comparison circuit connected to said detecting circuit and said reference signal circuit for comparing the detected signal with the reference signal; and
   an output circuit connected to said comparison circuit for generating a flow rate signal indicative of the flow rate of the fluid based on the output of said comparison circuit.

8. An ultrasonic Doppler flowmeter according to claim 7, wherein:
   said reference signal circuit includes a feedback circuit connected to the output of said comparison circuit for raising the level of said reference signal when the output level of said comparison circuit is low and lowering the level of said reference signal when the output level of said comparison circuit is high.

* * * * *